United States Patent [19]

Holmes

[11] 4,147,114
[45] Apr. 3, 1979

[54] WASTE TREATMENT SYSTEM

[75] Inventor: Wayne W. Holmes, Brigham City, Utah

[73] Assignee: Thiokol Corporation, Newtown, Pa.

[21] Appl. No.: 848,623

[22] Filed: Nov. 4, 1977

[51] Int. Cl.² .................. B01D 33/00; F23G 5/02
[52] U.S. Cl. ..................... 110/221; 110/257; 210/297; 210/298; 210/384; 210/387; 210/260
[58] Field of Search .............. 209/269, 287; 210/19, 210/67, 259, 260, 297, 298, 359, 384, 387, 388; 110/221, 257

[56] References Cited

U.S. PATENT DOCUMENTS

| 2,691,446 | 10/1954 | Murray | 210/387 X |
| 3,419,149 | 12/1968 | Allen | 210/297 X |
| 3,655,048 | 4/1972 | Pergola | 210/67 |
| 3,747,766 | 7/1973 | Brooks | 210/259 |
| 4,073,242 | 2/1978 | Wagner | 210/67 X |

Primary Examiner—Frank A. Spear, Jr.
Assistant Examiner—Richard W. Burks
Attorney, Agent, or Firm—Stanley A. Marcus; Edward E. McCullough

[57] ABSTRACT

The discharge end portion of a sewage delivery tube is surrounded by the input end portion of a conveyor pipe. A long, flat strip of consumable filter material is inserted through the annular space between them and into the conveyor pipe. Prior to this insertion, however, the filter strip is shaped and fastened into the form of a closed tube. The conveyor pipe discharges into an incinerator equipped with means for breaking the sewage sludge into burnable droplets. The conveyor pipe is supported over a liquid-collecting funnel and is perforated in the portion thereof that is over the funnel. A vibrator attached to the conveyor pipe oscillates it longitudinally; and ratchet teeth inside the conveyor pipe are oriented to cooperate with the vibrator to urge the filter-encased sludge toward the incinerator.

11 Claims, 3 Drawing Figures

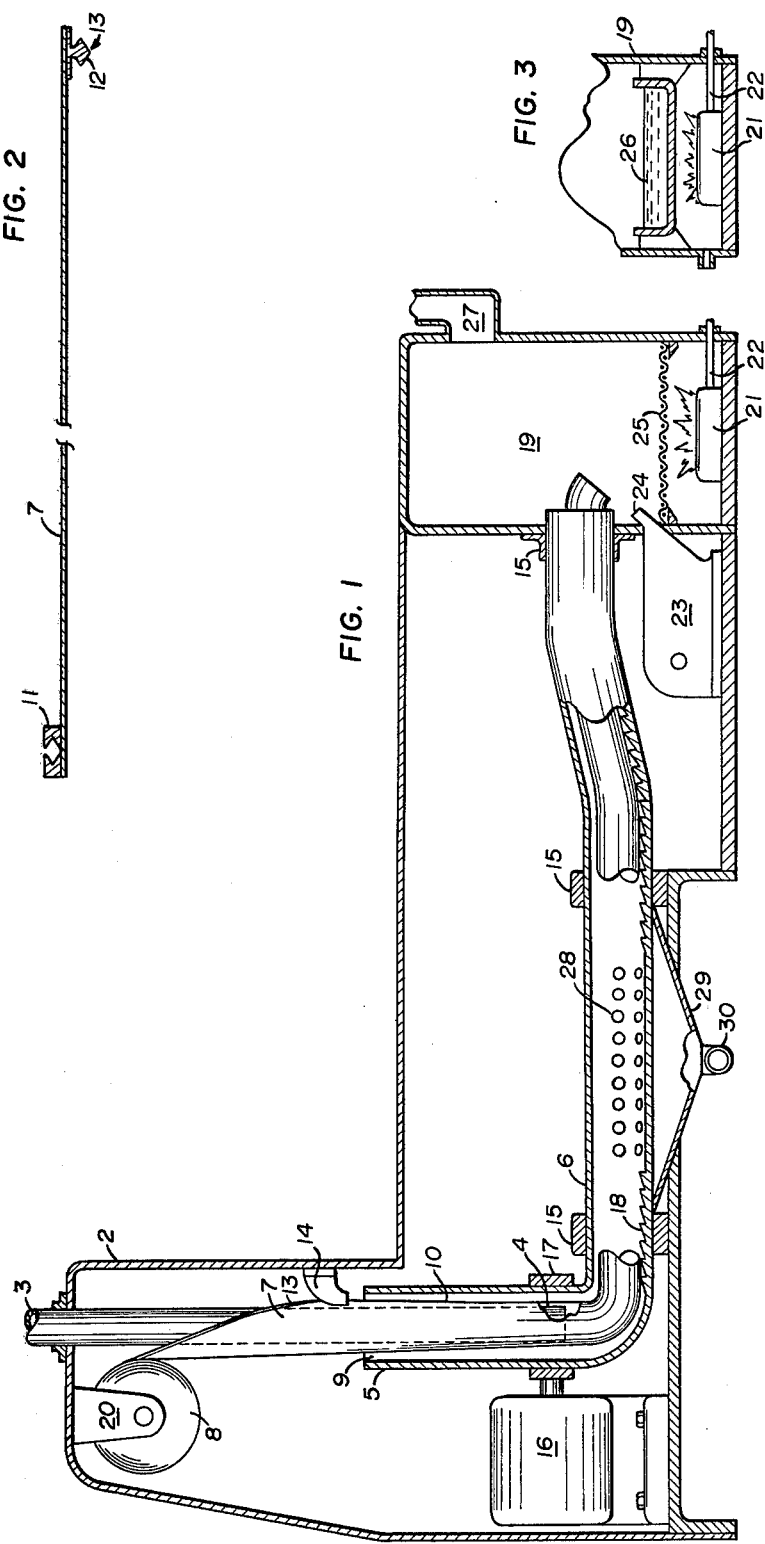

WASTE TREATMENT SYSTEM

BACKGROUND OF THE INVENTION

This invention relates to systems for sewage treatment. More specifically, it relates to systems for separating the liquid content from the sludge and delivering the sludge to an incinerator via disposable filtering means.

The lack of uniform density, the thick, sticky consistency, and fiber content of the sludge of ordinary sewage have always presented major problems in sewage treatment systems. Pipes, filters, and macerating or grinding devices, commonly used in such systems, tend to become repeatedly clogged and frequently must be cleared in order to maintain operability.

SUMMARY OF THE INVENTION

An object of the present invention is to overcome these difficulties of the prior art by providing a sewage treatment system that does not use grinding or macerating devices or pumps. Another object of the invention is to provide such a system wherein the filtering means is consumable and cannot interrupt operation of the entire system by becoming clogged. Another object of the invention is to provide such a system wherein the conveyor pipe that conveys sludge to an incinerator cannot become clogged.

The invention that accomplishes these objects has sewage delivery tube, which introduces raw sewage into the system. The input end of a conveyor pipe surrounds the discharge end portion of the delivery tube, leaving an annular space between them. A flat strip of consumable filter material is inserted into the conveyor pipe through this annular space. However, just before its insertion, it is shaped and fastened into a tubular form.

The discharge portion of the delivery tube and the input portion of the conveyor pipe are substantially vertically positioned, but the main portion of the conveyor pipe leads to an incinerator and is substantially horizontal. A vibrator is attached to the conveyor pipe, and oscillates it in the direction of the pipe. Ratchet teeth inside the pipe cooperate with the vibrator in urging the filter-encased sludge toward the incinerator, which is equipped with means for breaking the sludge into burnable droplets. An intermediate portion of the conveyor pipe is perforated, so that the liquid content of the sewage may drain into a large funnel.

The vibrator performs several functions simultaneously: (1) It conveys the filter-encased sludge toward the incinerator; (2) It promotes rapid filtering out of the liquid content; (3) It tends to break up lumps of organic material in the sludge; (4) It tends to make the flow rate of sludge more constant as it enters the incinerator; and (5) It cooperates with means in the incinerator for separating the sludge into burnable droplets.

Other objects and advantages of the invention will become apparent as the following, detailed description is read with reference to the accompanying drawings. The same numbers refer to the same parts throughout the disclosure.

BRIEF DESCRIPTION OF THE DRAWINGS

In the drawings:

FIG. 1 is a longitudinal section of the system apparatus;

FIG. 2 is a greatly enlarged cross section of the filter strip, to show a preferred fastening means for making it tubular; and FIG. 3 is a section of a portion of the incinerator, showing an alternative means of breaking sludge into burnable droplets.

DESCRIPTION OF THE PREFERRED EMBODIMENTS

As shown in FIG. 1, most of the apparatus is supported in a housing 2. A sewage delivery tube 3, which leads from a source of sewage not shown, has its discharge end portion 4 surrounded by the input end portion 5 of a conveyor pipe 6.

A long, flat strip of filter material 7, stored on an idler spool 8, is inserted into the annular space 9 between the delivery tube 3 and the conveyor pipe 6. Before such insertion, however, the filter strip 7 is made and fastened into the form of a tube 10. This is accomplished by the two members 11 and 12 of a zipper 13, one of which is attached to one edge of the filter strip 7 and the other to the other edge thereof, as they pass through a slide fastener 14. This fastener 14 is of a conventional type, and is mounted to the housing 2 adjacent the input end 5 of the conveyor pipe 6. Although the zipper 13 may be any of various types, a preferred zipper is the plastic, tongue-and-groove type. Other means may be used to fasten the opposite edges of the filter strip together, such as sewing, stapling, adhesive bonding, plastic welding, etc.

The filter strip 7, itself, must be fairly strong, inexpensive, porous, and consumable. A preferred material is paper, reinforced with Nylon fibers. However, many other materials may be used for this purpose, such as cotton cloth, burlap, etc.

The conveyor pipe 6 is supported by thrust bearings 15, attached to the base of the housing 2 and to the incinerator 19. These bearings 15 permit motion of the pipe, as it is oscillated along its axis by a vibrator 16, which is attached thereto by a collar 17. Ratchet teeth 18, on the inside of the conveyor pipe 6 are oriented to urge the filter-encased sludge toward the incinerator 19.

At least one of the brackets 20 that hold the spool 8 is made of spring material whereby it exerts a slight pressure against the spool 8. Hence, the weight of sludge inside the filter tube 10, bearing against the ratchet teeth 18, is necessary before the filter material can be pulled from the spool 8 and conveyed to the incinerator 19. The same effect may be achieved by inserting a small spring between one of the brackets 20 and the spool 8.

The incinerator 19 contains a heat source capable of heating the interior thereof to at least approximately 1,000° F. (531° C.), so that the sludge is completely consumed. A preferred source of heat for this purpose is an oil burner 21, having an inlet pipe 22 for fuel from a source not shown. Some means for breaking the sludge into burnable droplets is also incorporated into the incinerator 19. The means shown in FIG. 1 is a blower 23 having a nozzle 24 capable of directing a high-pressure jet of air at substantially right angles to the sludge, as it emerges from the conveyor pipe 6. A flame holder or grate 25 provides a support for larger droplets or solid pieces that have not been broken up by the action of the vibrator 16, while they are consumed. This grate 25 is a coarse-mesh, stainless-steel screen. Alternatively, it may be made of other refractory materials, such as nickel-based alloys sold under the trade names, Hastelloy C-4 and Inconel 625, manufactured and sold by the Cabot Corporation of Kokomo, Ind., and the International Nickel Co.,Inc., of Huntington, W. Va., respectively.

Another means (FIG. 3) of breaking the sludge into burnable droplets is a container 26 of molten metal, such as lead. This may be heated by the oil burner 21. As the sludge is allowed to drop onto the surface of the molten metal, it is violently sprayed into the heated air of the incinerator 19. Other heavy liquids may be used for this purpose, if the specific gravity thereof is greater than the sludge, so that the sludge will always float on the heated liquid.

The incinerator 19 is also equipped with a flue 27 for exhausting hot air at approximately the same rate as air is introduced by the blower 23. Depending on the design of the conveyor pipe 6, it may be desirable to install an exhaust fan in the flue 27 to create a pressure within the incinerator that is slightly lower than that of atmosphere, so that hot gases from the incinerator will not enter the conveyor pipe.

The vibrator 16 eliminates some of the conventional elements of sewage treatment systems, such as grinders or macerators and pumps. In conjunction with the filter tube 10, it avoids the usual clogging of pipes.

The underside of an intermediate zone of the conveyor pipe 6 has perforations 28 that permit the liquid content of the sewage to drain into a large funnel 29 as it is filtered out of the sludge by action of the vibrator. An outlet tube 30 from the funnel 29 is connectable to other apparatus for further treatment of the liquid. If this liquid has a significant sludge content, it may be recycled through the delivery tube 3; or it may be directed through a delivery tube to a parallel, identical apparatus.

An invention has been described that advances the art of sewage treatment. Although it has been set forth specifically with regard to details, it should be noted that many details may be altered without departing from the scope of the invention, as it is defined in the following claims.

The invention claimed is:

1. A waste treatment system comprising:
    a sewage delivery tube having a discharge end for introducing sewage into the system;
    a conveyor pipe having an input end and a discharge end and perforations in an intermediate zone thereof, the input end of which surrounds the discharge-end portion of the delivery tube with an annular space therebetween;
    a funnel positioned directly beneath the perforations to collect liquid from sewage;
    a long, flat, porous strip of consumable filter material, one end of which is inserted into the conveyor pipe around the sewage delivery tube;
    means for storing the filter strip;
    means for continuously forming the strip of filter material into a closed tube prior to its entry into the conveyor pipe;
    a vibrator attached to the conveyor pipe to oscillate it along the axis thereof;
    ratchet teeth inside the conveyor pipe oriented to urge the sludge-containing filter toward the discharge end thereof, when oscillated; and
    an incinerator in communication with the discharge end of the conveyor pipe to receive sludge therefrom, having a source of heat capable of burning sludge.

2. The waste treatment system of claim 1 wherein the means for forming the filter strip into a closed tube comprises a zipper wherein one member thereof is fixed to one edge of the filter strip and the other member is fixed to the other edge; and a slide fastener fixed adjacent the input end of the conveyor pipe, for fastening the two members together.

3. The waste treatment system of claim 2 wherein the zipper is the plastic, tongue-and-groove type.

4. The waste treatment system of claim 1 wherein the means for storing the filter material is an idler spool, operatively fixed to the input end of the conveyor pipe.

5. The waste treatment system of claim 4 further including spring means for exerting pressure against the spool, so that the filter strip cannot be conveyed to the incinerator without the weight of sludge therein.

6. The waste treatment system of claim 1 wherein the source of heat is an oil burner capable of heating the interior of the incinerator to about 1,000° F. (531° C.).

7. The waste treatment system of claim 1 further including means in the incinerator for dispersing sludge from the conveyor pipe into burnable droplets.

8. The waste treatment system of claim 7 wherein the means for dispersing sludge into droplets comprises a blower having a nozzle attached adjacent the discharge end of the conveyor pipe, the nozzle positioned to direct forced air from the blower against sludge that emerges from the conveyor pipe.

9. The waste treatment system of claim 7 wherein the means for dispersing sludge into droplets is a container and a metal therein that is meltable by the source of heat, and positioned below the discharge end of the conveyor pipe.

10. The waste treatment system of claim 8 wherein the metal is lead.

11. The waste treatment system of claim 1 wherein the filter material is paper reinforced with threads of Nylon.

* * * * *